United States Patent [19]

Wortman et al.

[11] Patent Number: 4,590,596
[45] Date of Patent: May 20, 1986

[54] METHOD AND APPARATUS FOR MODULATING A DIFFRACTION RADIATION GENERATOR

[75] Inventors: Donald E. Wortman, Rockville, Md.; Herbert Dropkin, Washington, D.C.; Richard P. Leavitt, Berwyn Heights, Md.

[73] Assignee: The United States of America as represented by the Secretary of the Army, Washington, D.C.

[21] Appl. No.: 620,975

[22] Filed: Jun. 15, 1984

[51] Int. Cl.$^4$ .............................................. H01S 3/00
[52] U.S. Cl. ........................................ 372/2; 372/28; 372/9; 372/102; 315/3.5; 315/4
[58] Field of Search ................ 372/2, 26, 102, 28, 372/9; 315/3.5, 4.5

[56] References Cited

PUBLICATIONS

Wortman et al., "The Orotron Emerges as a Millimeter-Wave Source", Microwaves, p. 126, May 1982.
Wortman et al., Millimeter-Wave Orotron Oscillation–Part II Experiment"; IEEEJQE, vol. QE–17, No. 8, Aug. 1981.

Primary Examiner—Léon Scott, Jr.
Attorney, Agent, or Firm—Saul Elbaum; Thomas E. McDonald; Anthony T. Lane

[57] ABSTRACT

Method and apparatus for modulating coherent radiation generated by an orotron in accordance with a low voltage control signal applied to the diffraction grating to vary the grating-to-cathode voltage from the cathode-to-collector voltage over a selected voltage range determined by the maximum and minimum values of the control voltage. For amplitude modulation, the grating-to-cathode voltage is varied within a voltage range between a lower voltage at which the orotron output power starts to fall abruptly and a cutoff voltage at which coherent radiation ceases. For frequency modulation, the grating-to-cathode voltage is varied within a voltage range, including the point of maximum power output, where there is a minimum change of output power with a change in the grating-to-cathode voltage.

10 Claims, 2 Drawing Figures

METHOD AND APPARATUS FOR MODULATING A DIFFRACTION RADIATION GENERATOR

RIGHTS OF THE GOVERNMENT

The invention described herein may be manufactured, used, and licensed by or for the United States Government for governmental purposes without payment to us of any royalty thereon.

BACKGROUND OF THE INVENTION

The invention relates generally to the method and apparatus for generating coherent near-millimeter-wavelength radiation. More particularly, the invention relates to a method and apparatus for continuously modulating the coherent radiation generated by a diffraction radiation generator.

In a diffraction radiation generator, such as orotron, a ribbon electron beam is generated by applying a direct voltage between the cathode and anode of an electron gun. Generally, a negative voltage is applied to the cathode while the anode is operated near ground potential. The electron beam is directed through an open resonator formed by two spaced-apart mirrors to a collector disposed on an opposite side of the open resonator from the electron gun. In the open resonator, the ribbon electron beam passes over the surface of a periodic metal structure, e.g., a reflecting diffraction grating partially covering one of the mirrors, and radiates into a mode of the open resonator. The radiation is fed back onto the ribbon beam and bunches the electrons therein. When the proper conditions of synchronism between the electron beam velocity and the phase velocity of a slow wave propagating along the diffraction grating surface are met, the orotron will radiate coherently at a frequency at or near one of the resonant frequencies of the open resonator. The resonant frequencies of the open resonator are determined by the mirror separation. The electron velocity, in the interaction region where the ribbon beam and the radiation field interact, is determined by the grating-to-cathode voltage. The ribbon beam current is controlled by the anode-to-cathode voltage.

In the past, the cathode has been maintained at a negative voltage of a few thousand volts with respect to ground, and the collector, diffraction grating, and mirrors of the open resonator have been maintained at or near ground potential. When pulsed operation of the orotron was desired, the anode was pulsed with a positive voltage relative to the cathode voltage to generate the ribbon electron beam. In such a high voltage pulsing operation, the pulse frequency was limited by the turn on and turn-off times of the electron gun, and the pulses produced exhibited a "leading edge jitter".

Instead of switching the electron gun on and off at high voltage, the orotron output can be pulsed by continuously operating the electron gun and pulsing the diffraction grating at a low voltage to rapidly initiate or cut off the coherent radiation output of the orotron. The coherent radiation generated within the open resonator of the orotron cuts off rapidly as the grating-to-cathode voltage is increased above a point of maximum power or gain. Thus, the electron gun can be operated continuously, and the orotron output rapidly switched on and off by applying a small pulse, less than ten volts, to the diffraction grating. Such continuous operation of the electron gun also negates the leading-edge jitter caused by thermal effects when the beam current is pulsed.

In addition to low voltage pulse modulation of the orotron output radiation, it would be highly desirable to continuously modulate the amplitude or frequency of the orotron output radiation by a low voltage control signal.

OBJECTS AND SUMMARY OF THE INVENTION

Therefore, it is an object of the invention to provide a method and apparatus for amplitude modulating the coherent radiation generated by a diffraction radiation generator in accordance with a low voltage control signal.

It is another object of the invention to provide a method and apparatus for frequency modulating the coherent radiation generated by a diffraction radiation generator in accordance with a low voltage control signal.

During operation of an orotron, as the grating-to-cathode voltage is increased, the orotron will start to radiate coherently at a minimum, or starting, grating voltage. Thereafter, as the grating-to-cathode voltage is increased, the power output of the orotron increases, then levels off as it approaches a point of maximum power output, and thereafter falls abruptly and ceases completely at a maximum, or cutoff, grating voltage.

The coherent radiation generated by the orotron can be AM modulated by varying the grating-to-cathode voltage in accordance with a modulation control signal within a narrow voltage range, between a lower voltage at which the orotron output power starts to fall abruptly and the grating cutoff voltage. Since this voltage range is very small, generally not exceeding one volt, the frequency of the coherent radiation will remain essentially constant while the amplitude of the coherent radiation can be varied from zero to a value close to the maximum power output of the orotron.

The coherent radiation generated by the orotron can be FM modulated by varying the grating-to-cathode voltage in accordance with a control signal within a voltage range, including the point of maximum power output, where there is a minimum change of output power with a change in the grating-to-cathode voltage.

BRIEF DESCRIPTION OF THE DRAWINGS

The invention will be better understood, and further objects, features, and advantages thereof will become more apparent from the following description of the preferred embodiments, taken in conjunction with the accompanying drawings in which.

DESCRIPTION OF THE PREFERRED EMBODIMENT

Figure 1:
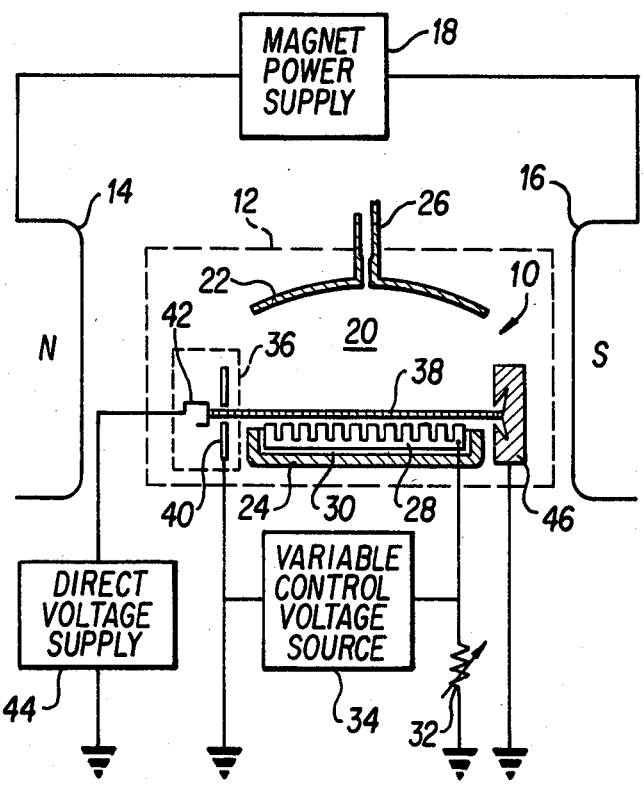
FIG. 1 is a schematic diagram of an orotron, according to the invention.

Referring now to FIG. 1, an orotron 10 is disposed within a vacuum chamber 12 between north and south poles 14, 16 of a magnet energized by a magnet power supply 18. The orotron includes an open resonator 20 formed by two spaced-apart mirrors 22, 24. The upper mirror 22 includes a centrally located waveguide output coupling 26 for receiving coherent radiation generated within the open resonator 20. The lower mirror 24 includes a reflecting diffraction grating 28 which is embedded therein and which is electrically insulated from the lower mirror 24 by a layer 30 of electrically insulating material, such as beryllium oxide. The diffraction grating 28 is connected to ground through a resistor 32, and to the negative terminal of a variable control voltage source 34 having a grounded positive terminal.

An electron gun 36 for generating a ribbon electron beam 38 is dipsosed on one side of the open resonator 20. The electron gun 36 includes an anode 40 having a horizontal slit therethrough to accommodate the ribbon beam 38, and a cathode 42 which is connected to the negative terminal of a direct voltage supply 44 having a grounded positive terminal.

A collector 46, which is disposed on an opposite side of the open resonator 20, is connected to ground. During operation of the orotron, the ribbon electron beam 38 generated at the cathode 42 is guided by the magnetic field extending between the north and south pole pieces 14, 16 across the diffraction grating 28 to the collector 46. As the ribbon electron beam 38 passes over the surface of the diffraction grating 28, it radiates in a mode of the open resonator 30. The radiation from the open resonator 20 is then fed back onto the ribbon beam 38 causing the electrons therein to bunch together. When the proper conditions of synchronism are met between the electron velocity and the phase velocity of an evanescent wave propagating along the grating surface, the orotron 10 will radiate coherently at a frequency near one of the resonant frequencies of the resonator. The velocity of the ribbon beam 38 as it passes through the open resonator 20 is determined by the beam acceleration voltage in the interaction zone, that is by the voltage difference between the diffraction grating 28 and the cathode 42.

Figure 2:
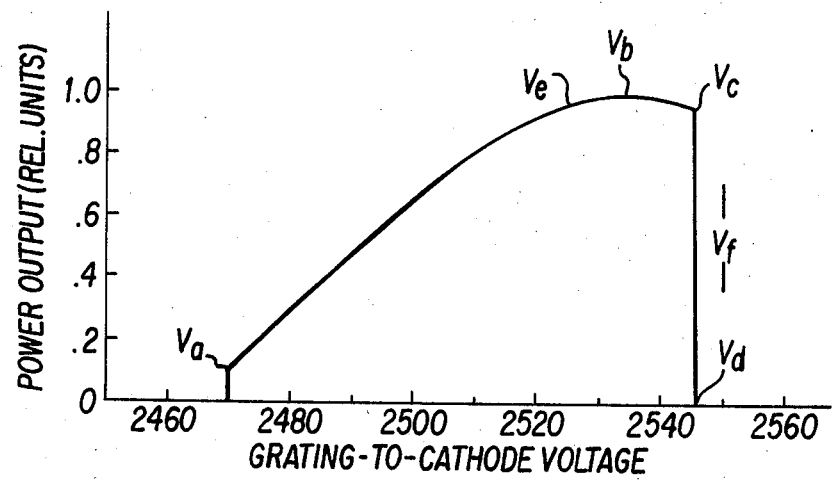
FIG. 2 is a power profile of a single mode of the orotron of FIG. 1, showing the variation of output power with the grating-to-cathode voltage.

The orotron 10 can be tuned over a single mode of the resonator 20 with the mirror separation held fixed by varying the grating-to-cathode voltage over a limited range. For example, FIG. 2 shows the power profile of a single mode of a 50 to 75 GHz orotron developed at Harry Diamond Laboratories, Adelphi, Md. As shown in FIG. 2, coherent radiation is intiated at a grating-to-cathode voltage $V_a$ of approximately 2470 volts. As the grating-to-cathode voltage is increased above $V_a$, the orotron power output increases to a maximum value at a grating-to-cathode voltage $V_b$ of approximately 2535 volts, thereafter, as the grating-to-cathode voltage is further increased, the orotron power output abruptly starts to decrease very rapidly at a grating-to-cathode voltage $V_c$ of approximately 2545 volts, and ceases altogether at a cutoff voltage $V_d$ of approximately 2546 volts.

Since the coherent radiation frequency only increases by approximately 0.25 MHz for each one volt increase in the grating-to-cathode voltage, when the grating-to-cathode voltage is varied between $V_c$ and $V_d$, the orotron power output varies between 0.96 of maximum power to zero, while the coherent radiation frequency remains essentially constant. However, when the grating-to-cathode voltage is varied between $V_c$ and a voltage $V_e$ of approximately 2525 volts at which the orotron output power is 0.96 maximum power, the coherent radiation frequency is varied over a range of approximately 5 MHz, with minimal variation in the orotron power output ($\pm 2\%$).

To pulse modulate the coherent radiation output of the orotron 10, the cathode 42 is supplied with a negative voltage from the direct voltage supply 44 such that, in the absence of a control voltage signal from the variable control voltage source 34, the beam acceleration voltage between the diffraction grating 28 and the cathode 42 will be at a value $V_f$ greater than the cutoff voltage $V_c$, for example, 2550 volts in FIG. 2, at which value no coherent radiation is generated. If then a negative voltage pulse is applied to the diffraction grating 28 by the control voltage source 34 to lower the grating-to-cathode voltage to the maximum power voltage $V_b$, maximum coherent radiation is immediately initiated and continues for the duration of the negative pulse. Since this negative pulse can be applied to the diffraction grating 28 in picoseconds, the ultimate speed at which orotron 10 can be switched on and off depends on the Q of the resonant cavity 20. Also, the output pulses thus generated do not exhibit the leading-edge jitter which occurs when the orotron output radiation is pulse modulated by switching the electron gun 32 on and off.

To AM modulate the coherent radiation generated by the orotron 10 in accordance with a modulation control signal supplied from the variable control voltage source 34, the cathode 42 is supplied with a negative voltage from the direct voltage supply 44 such that, in the absence of a negative modulation control signal from the control voltage source 34, the beam accelerating voltage between the grating 28 and the cathode 42 will be the cutoff voltage $V_d$, and the resistor 32 will be adjusted so that the maximum negative modulation control voltage output of the control voltage source 44 will not lower the beam accelerating voltage below the voltage $V_c$ at which the power output of the orotron starts to rapidly decrease. Thus, by varying the grating-to-cathode voltage over a range of about one volt, the amplitude of the coherent radiation can be varied from zero to a value close to the maximum output value, without significantly changing the output frequency.

To FM modulate the coherent radiation generated by the orotron 10 in accordance with a modulation control voltage signal supplied from the variable control voltage source 34, the cathode 42 is supplied with a negative voltage from the direct voltage supply 44 such that, in the absence of a modulation control voltage signal from the control voltage source 34, the beam accelerating voltage between the grating 28 and the cathode 42 is at a voltage $V_g$ not exceeding the voltage $V_c$ at which the output power of the orotron 10 starts to rapidly decrease. The resistor 32 is adjusted such that the maximum expected negative control voltage supplied by the control voltage source 34 will cause the grating-to-cathode voltage to decrease to a value $V_h$, not less than $V_e$, at which the output power is approximately the same as the output power at the grating voltage of $V_g$. Thus, as the control voltage signal from the control voltage source 34 is varied, the grating-to-cathode voltage will be varied between the voltages $V_g$ and $V_h$, to thus vary the coherent radiation output frequency with minimum variation in the amplitude, or power output.

Alternatively, the cathode 42 can be supplied with a negative voltage from the direct voltage supply 44 such that, in the absence of a modulation control voltage signal from the control voltage source 34, the grating-to-cathode voltage is at a voltage midway between $V_g$ and $V_h$. Then an alternating modulation control voltage from the variable control voltage source 34 can be superimposed upon the direct voltage output of the direct voltage supply 44, to vary the grating-to-cathode voltage between $V_g$ and $V_h$.

Since there are many modifications, variations, and additions to the specific embodiments of the invention described herein which would be obvious to one skilled in the art, it is intended that this scope of the invention be limited only by the appended claims.

What is claimed and desired to be secured by Letters Patent of the United States is:

1. A method of generating and continuously modulating coherent near millimeter wavelength radiation in accordance with a modulation control signal, comprising the simultaneous steps of:
   generating a ribbon electron beam by applying a negative voltage to a cathode of an electron gun having an anode connected to ground;
   directing the ribbon beam to a collector connected to ground over a metallic reflecting diffraction grating which is disposed within an open resonator and which is connected to ground through a resistive element, whereby the grating-to-cathode voltage determining the amplitude and frequency of coherent radiation generated within the open resonator is the same as the voltage applied to the cathode in the absence of any other signal supplied to the diffraction grating; and
   supplying the modulation control signal to the diffraction grating, to vary the grating-to-cathode voltage over a selected voltage range determined by the cathode voltage and the maximum and minimum values of the modulation control signal, the cathode voltage and the maximum and minimum values of the modulation control signal being selected such that a first parameter of the two coherent radiation parameters of amplitude and frequency will vary with the grating-to-cathode voltage over the selected voltage range and the second parameter of the two coherent radiation parameters will remain approximately constant over the selected voltage range.

2. A method, as described in claim 1, wherein:
   the direct voltage applied to the cathode is selected such that, in the absence of the modulation control signal, the grating-to-cathode voltage will be a cutoff voltage $V_d$ at which the coherent radiation ceases; and
   the modulation control signal is a direct negative voltage having a maximum value, which, when supplied to the diffraction grating, will not lower the grating-to-cathode voltage below a voltage $V_e$ at which the coherent radiation starts to rapidly decreases;
   whereby the first coherent radiation parameter is the coherent radiation amplitude.

3. A method, as described in claim 1, wherein:
   the direct voltage applied to the cathode is selected such that, in the absence of the modulation control signal, the grating-to-cathode voltage will be a voltage $V_g$ less than a voltage $V_c$ at which the coherent radiation starts to rapidly decrease and greater than a voltage $V_b$ at which the coherent radiation increases to a maximum value; and
   the modulation control signal is a direct negative voltage having a maximum value which, when supplied to the diffraction grating, will cause the grating-to-cathode voltage to decrease to a voltage $V_h$, at which the coherent radiation is approximately the same as the coherent radiation at the grating-to-cathode voltage $V_g$;
   whereby the first coherent radiation parameter is the coherent radiation frequency.

4. A method, as described in claim 1, wherein:
   the direct negative voltage supplied to the cathode is selected such that, in the absence of the modulation control signal, the grating-to-cathode voltage will be approximately $V_b$ at which the coherent radiation increases to a maximum value; and
   the modulation control signal is an alternating voltage having maximum positive and negative values such that when the modulation control signal is supplied to the diffraction grating, the grating-to-cathode voltage is varied within a voltage range between a high voltage $V_g$ greater than the voltage $V_b$ and less than a voltage $V_c$ at which the coherent radiation starts to rapidly decrease, and a low voltage $V_h$ less than the voltage $V_c$ at which the coherent radiation is approximately the same as the coherent radiation at the grating-to-cathode voltage $V_g$;
   whereby the first coherent radiation parameter is the coherent radiation frequency.

5. A method of generating and continuously modulating the amplitude of coherent near millimeter wavelength radiation in accordance with a variable negative modulation control voltage, comprising the simultaneous steps of:
   generating a ribbon electron beam by applying a negative voltage to a cathode of an electron gun having an anode connected to ground;
   directing the ribbon beam to a collector connected to ground over a metallic reflecting diffraction grating which is disposed in an open resonator and which is connected to ground through a resistive element, the negative voltage supplied to the cathode being selected such that, in the absence of any voltage signal applied to the diffraction grating, the grating-to-cathode voltage determining the amplitude and frequency of coherent radiation generated within the open resonator will be a cutoff voltage $V_d$ at which the coherent radiation ceases; and
   supplying the negative modulation control voltage to the diffraction grating, the modulation control voltage having a maximum negative value which is less than the difference between the grating-to-cathode voltage $V_d$ and a grating-to-cathode voltage $V_c$ at which the coherent radiation starts to rapidly decrease;
   whereby, as the modulation control voltage is varied between zero and its maximum negative value, the coherent radiation generated within the open resonator varies from zero to a maximum value, while the coherent radiation frequency remains essentially constant.

6. A diffraction radiation generator for generating coherent near millimeter wavelength radiation, comprising:
   a collector, connected to ground;
   an open resonator including a metallic reflecting diffraction grating connected to ground through a resistive element;
   beam forming means for generating a ribbon electron beam, including a cathode, an anode connected to ground, and direct voltage supply means for supplying a negative voltage to the cathode;

beam directing means for directing the ribbon beam through the open resonator across the diffraction grating to the collector; and variable control voltage means for supplying a modulation control signal to the diffraction grating, to vary over a selected voltage range the grating-to-cathode voltage determining the amplitude and frequency of coherent radiation generated within the open resonator, the grating-to-cathode voltage being determined by the cathode voltage and the maximum and minimum values of the modulation control signal, the cathode and the maximum and minimum values of the modulation control signal being selected such that a first parameter of the two coherent radiation parameters of amplitude and frequency will vary with the grating-to-cathode voltage over the selected voltage range and the second parameter of the two coherent radiation parameters will remain approximately constant over the selected voltage range.

7. A diffraction radiation generator, as described in claim 6, wherein:

the cathode voltage is selected such that when the modulation control signal is zero, the cathode-to-grading voltage will be a cutoff voltage $V_d$ at which the coherent radiation ceases; and the modulation control signal is a direct voltage which varies over a range from zero to a maximum negative voltage which is less than the difference between the grating-to-cathode voltage $V_d$ and a grating-to-cathode voltage $V_c$ at which the coherent radiation starts to rapidly decrease;

wherein the first parameter is the coherent radiation amplitude.

8. A diffraction radiation generator, as described in claim 6, wherein:

the direct voltage applied to the cathode is selected such that, in the absence of the modulation control signal, the grating-to-cathode voltage will be a voltage $V_g$ less than a voltage $V_c$ at which the coherent radiation starts to rapidly decrease and greater than a voltage $V_b$ at which the coherent radiation increases to a maximum value; and the modulation control signal is a direct negative voltage having a maximum value which, when supplied to the diffraction grating, will cause the grating-to-cathode voltage to decrease to a voltage $V_h$, at which the coherent radiation is approximately the same as the coherent radiation at the grating-to-cathode voltage $V_g$;

wherein the first coherent radiation parameter is the coherent radiation frequency.

9. A diffraction radiation generator, as described in claim 6, wherein:

the direct negative voltage supplied to the cathode is selected such that, in the absence of the modulation control signal, the grating-to-cathode voltage will be approximately $V_b$ at which the coherent radiation increases to a maximum value; and the modulation control signal is an alternating voltage having maximum positive and negative values such that when the modulation control signal is supplied to the diffraction grating, the grating-to-cathode voltage is varied within a voltage range between a high voltage $V_g$ greater than the voltage $V_b$ and less than a voltage $V_c$ at which the coherent radiation starts to rapidly decrease, and a low voltage $V_h$ less than the voltage $V_c$ at which the coherent radiation is approximately the same as the coherent radiation at the grating-to-cathode voltage $V_g$;

whereby the first coherent radiation parameter is the coherent frequency.

10. A diffraction radiation generator for generating coherent near millimeter wavelength, comprising:

a collector connected to ground;

an open resonator including a metallic reflecting diffraction grating connected to ground through a resistive element;

beam forming means for generating a ribbon electron beam, including a cathode, an anode connected to ground, and direct voltage supply means for supplying a selected negative voltage to the cathode;

beam directing means for directing the ribbon beam through the open resonator across the diffraction grating to the collector; and variable control voltage means for supplying a negative modulation control voltage to the diffraction grating, to vary the grating-to-cathode voltage determining the amplitude and frequency of coherent radiation generated within the open resonator, the grating-to-cathode voltage being determined by the negative voltage applied to the cathode and the negative modulation control voltage applied to the diffraction grating, the negative voltage applied to the cathode being selected such that, when the negative modulation control voltage is zero, the grating-to-cathode voltage is a cutoff voltage $V_d$ at which the generation of coherent radiation within the open resonator ceases, and the negative modulation control voltage applied to the diffraction grating is selected to have a maximum negative value which is less than the difference between the grating-to-cathode voltage $V_d$ and a grating-to-cathode voltage $V_c$ at which the coherent radiation starts to rapidly decrease;

whereby, as the modulation control voltage is varied between zero and its maximum negative value, the coherent radiation generated within the open resonator varies from zero to a maximum value while the coherent radiation frequency remains essentially constant.

* * * * *